(12) United States Patent
Ikezaki et al.

(10) Patent No.: US 11,472,095 B2
(45) Date of Patent: Oct. 18, 2022

(54) FILAMENT WINDING APPARATUS

(71) Applicant: Murata Machinery, Ltd., Kyoto (JP)

(72) Inventors: Shu Ikezaki, Kyoto (JP); Motohiro Tanigawa, Kyoto (JP); Tadashi Uozumi, Kyoto (JP); Masatsugu Goyude, Kyoto (JP); Shota Miyaji, Kyoto (JP); Hirotaka Wada, Kyoto (JP); Takahiro Miura, Kyoto (JP); Makoto Tanaka, Kyoto (JP); Daigoro Nakamura, Kyoto (JP); Tetsuya Matsuura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 22 days.

(21) Appl. No.: 17/293,078

(22) PCT Filed: Nov. 12, 2019

(86) PCT No.: PCT/JP2019/044271
§ 371 (c)(1),
(2) Date: May 12, 2021

(87) PCT Pub. No.: WO2020/100865
PCT Pub. Date: May 22, 2020

(65) Prior Publication Data
US 2021/0394461 A1 Dec. 23, 2021

(30) Foreign Application Priority Data

Nov. 15, 2018 (JP) .............................. JP2018-214992

(51) Int. Cl.
*B29C 53/70* (2006.01)
*B29C 53/68* (2006.01)
(Continued)

(52) U.S. Cl.
CPC ............ *B29C 53/607* (2013.01); *B29C 53/62* (2013.01); *B29C 53/68* (2013.01);
(Continued)

(58) Field of Classification Search
None
See application file for complete search history.

(56) References Cited

U.S. PATENT DOCUMENTS

| 4,432,302 A | * | 2/1984 | Farris | .................... B05C 5/0241 |
| | | | | 118/410 |
| 2003/0051795 A1 | * | 3/2003 | Burgess | .................. B29C 53/68 |
| | | | | 156/169 |

(Continued)

FOREIGN PATENT DOCUMENTS

| JP | S61-290040 A | 12/1986 |
| JP | 2006-218777 A | 8/2006 |

(Continued)

*Primary Examiner* — Jeffry H Aftergut
(74) *Attorney, Agent, or Firm* — DLA Piper LLP (US)

(57) ABSTRACT

In a filament winding apparatus, a supplying device supplies fiber bundles to a surface of a core material. A moving part is movable relative to the core material, and rotatable around a rotational axis extending in a vertical direction. A small diameter aligning guide part is placed at the moving part and has an opening portion through which the core material can pass. The small diameter aligning guide part guides fiber bundles to an outer peripheral surface of the core material such that the fiber bundles are arranged side by side in a circumferential direction of the core material. The tightening fiber bobbin supporting part is placed at the moving part and rotates around a center of the opening portion. A winding guide rotates with the tightening fiber bobbin supporting part and guides a tightening fiber bundle drawn from a tightening fiber bobbin toward the surface of the core material.

8 Claims, 9 Drawing Sheets

(51) Int. Cl.
*B29C 53/60* (2006.01)
*B29C 53/62* (2006.01)
*B29C 53/80* (2006.01)
*B29C 70/32* (2006.01)
*B65H 54/10* (2006.01)
*B65H 57/00* (2006.01)

(52) U.S. Cl.
CPC .......... *B29C 53/8041* (2013.01); *B29C 70/32* (2013.01); *B65H 54/10* (2013.01); *B65H 57/006* (2013.01); *B65H 2701/31* (2013.01)

(56) References Cited

U.S. PATENT DOCUMENTS

| | | |
|---|---|---|
| 2006/0174998 A1 | 8/2006 | Takagi et al. |
| 2007/0125487 A1* | 6/2007 | Elliott ................ B29C 53/8016 156/173 |
| 2008/0197229 A1 | 8/2008 | Uozumi et al. |

FOREIGN PATENT DOCUMENTS

| | | |
|---|---|---|
| JP | 2008-195000 A | 8/2008 |
| JP | 2015-145104 A | 8/2015 |
| JP | 6051838 B2 | 12/2016 |
| JP | 6251070 B2 | 12/2017 |
| JP | 2018-144407 A | 9/2018 |

\* cited by examiner

SECOND EMBODIMENT

FILAMENT WINDING APPARATUS

TECHNICAL FIELD

This disclosure relates to a filament winding apparatus.

BACKGROUND

Conventionally, a bundle of filaments (fiber bundle) is wound around a core material to obtain a member of a predetermined shape. Japanese Patent Nos. 6051838 and 6251070 disclose that kind of configuration.

JP '838 discloses a curved-shape pipe manufacturing apparatus in which fiber bundles are fed out substantially parallel to a center axis of the core material (0° winding is applied). Thereafter, a fiber bundle different from the above-described fiber bundles is wound around the core material in a direction substantially perpendicular to the center axis of the core material to obtain a tight shape. In that configuration, the fiber bundles can be wound by other fiber bundles to be tightened. Accordingly, the fiber bundles can be prevented from separating from the core material.

JP '838 discloses a following curved-shape pipe manufacturing method. The core material has a linear shape. The fiber bundles located around the core material are wound by the other fiber bundle to be tightened. Thereafter, the core material covered by the fiber bundles and the other fiber bundle can be bent. JP '838 states that a curved pipe with improved stiffness can be obtained by the fiber bundles and the other fiber bundle covering the core material.

JP '070 discloses a following axial composite member manufacturing method. Prepregs are attached to each of straight portions and bent portions of a core metal along the axial direction of the core metal (0° winding is applied). Thereafter, a heat-shrinkable tape is wound around the core metal on which the prepregs are attached. In that method, while positions of the prepregs attached on the core metal are held by a rubber member, the prepreg can be restrained by the heat-shrinkable tape.

JP '838 does not disclose a configuration that the fiber bundles are attached around the core material which is bent from the beginning, and the other fiber bundle is wound to be tightened around the core material and the fiber bundles located around the core material. That is, the configuration of JP '838 is not supposed to be applied to a core material which is already bent. JP '070 does not disclose the specific structure such that the prepregs move relatively to the core metal to attach to the bent portions before the heat-shrinkable tape is wound.

It could therefore be helpful to provide a filament winding apparatus that can smoothly perform 0° winding of the fiber bundles onto a curved core material and tighten the fiber bundles after winding.

SUMMARY

We thus provide a filament winding apparatus including a rail extending in a first direction, a core material support device for supporting a core material, and a supplying device that supplies a fiber bundle to a surface of the core material. The supplying device includes a moving part, a fiber bundle guide, a tightening material bobbin support part, and a tightening material guide. The moving part is movable relative to the core material in the first direction. The moving part is movable in a second direction that is orthogonal to the first direction. The moving part is provided to be rotatable around a first rotational axis extending in a third direction orthogonal to each of the first direction and the second direction. The fiber bundle guide is placed at the moving part. The fiber bundle guide has an opening portion through which the core material can pass. The fiber bundle guide guides a plurality of the fiber bundles to an outer peripheral surface of the core material such that the plurality of the fiber bundles are arranged side by side in a circumferential direction of the core material. The tightening material bobbin support part is placed at the moving part and rotates around a center of the opening portion. The tightening material guide rotates around the center of the opening portion integrally with the tightening material bobbin support part. The tightening material guide guides a tightening material drawn from a bobbin supported by the tightening material bobbin support part toward the surface of the core material.

Accordingly, the 0° winding, in which a fiber orientation angle is substantially 0° relative to the axial direction of the core material, can be easily performed. A position and a direction of the fiber bundle guide and the like can be changed with respect to the core material. Therefore, the fiber bundles can be arranged on the outer peripheral surface of the core material which is curved and the fiber bundles arranged around the core material can be wound by the tightening material and tightened with respect to the core material.

It is preferable that the filament winding apparatus is configured as follows. The filament winding apparatus includes a first drive source, a second drive source, a third drive source, a fourth drive source, and a control device. The first drive source moves at least any of the core material support device and the winding device in the first direction. The second drive source moves the moving part in the second direction. The third drive source rotates the moving part around the first rotational axis. The fourth drive source rotates the tightening material guide around the center of the opening portion. The control device controls the first drive source, the second drive source, the third drive source, and the fourth drive source.

Accordingly, the 0° winding of the fiber bundles on the outer peripheral surface of the core material can be performed automatically, while adjusting a posture of the fiber bundle guide and the like in accordance with a shape of the core material which is curved.

It is preferable that the filament winding apparatus is configured as follows. The moving part includes a first member and a second member. The first member is movable relative to the core material in the first direction. The first member is movable in the second direction that is orthogonal to the first direction. The first member is provided to be rotatable around the first rotational axis extending in the third direction orthogonal to each of the first direction and the second direction. The second member is movable in the third direction relative to the core material. The second member is provided to be rotatable around a second rotational axis extending in the second direction. The fiber bundle guide, the tightening material bobbin support part, and the tightening material guide are placed at the second member.

Accordingly, the position of the fiber bundle guide and the like can be changed in a three-dimensional manner with respect to the core material. Therefore, even if the core material is curved in a three-dimensional manner, the 0° winding of the fiber bundle can be performed on the outer peripheral surface of the core material.

It is preferable that the filament winding apparatus is configured as follows. The filament winding apparatus further includes a fifth drive source and a sixth drive source. The fifth drive source rotates the second member around the second rotational axis. The sixth drive source moves at least one of a position at which the core material support device supports the core material, and the second member in the third direction.

Accordingly, the second member can be rotated easily around the second rotational axis by using the fifth drive source. The second member can be moved easily relative to the core material in the third direction by using the sixth drive source.

In the filament winding apparatus, it is preferable that the core material support device supports the core material rotatably around an axis that is parallel to the first direction.

Accordingly, even if the core material is curved in a complicated three-dimensional manner, for example, by rotating the core material in accordance with the shape of the core material (curvature), the posture of the core material can be changed such that the 0° winding is performed easily. Therefore, the scope of application of the filament winding apparatus can be expanded and the fiber bundles can be arranged on the core material of various shapes.

The filament winding apparatus preferably includes a seventh drive source for rotating the core material with respect to the core material support device.

Accordingly, the core material can be rotated easily by using the seventh drive source.

It is preferable that the filament winding apparatus is configured as follows. The supplying device includes an upstream side fiber bundle guide which is provided on an upstream side of the fiber bundle guide in a direction of traveling of the fiber bundles. The upstream side fiber bundle guide is placed at the moving part. The upstream side fiber bundle guide has the second opening portion through which the core material can pass. An opening area of the second opening portion in the upstream side fiber bundle guide is larger than an opening area of the opening portion in the fiber bundle guide.

Accordingly, the fiber bundles are guided by the upstream side fiber bundle guide, and then guided by the fiber bundle guide which is located nearer to the core material than the upstream side fiber bundle guide. This two-step guiding allows the fiber bundles to be smoothly supplied to the surface of the core material.

It is preferable that the filament winding apparatus is configured as follows. The moving part has a passage opening portion through which the core material pass. An opening area of the opening portion in the fiber bundle guide is smaller than an opening area of the passage opening portion.

Accordingly, the fiber bundles can be guided to a position near the surface of the core material by the fiber bundle guide. Therefore, the good winding result can be performed.

Figure 1:
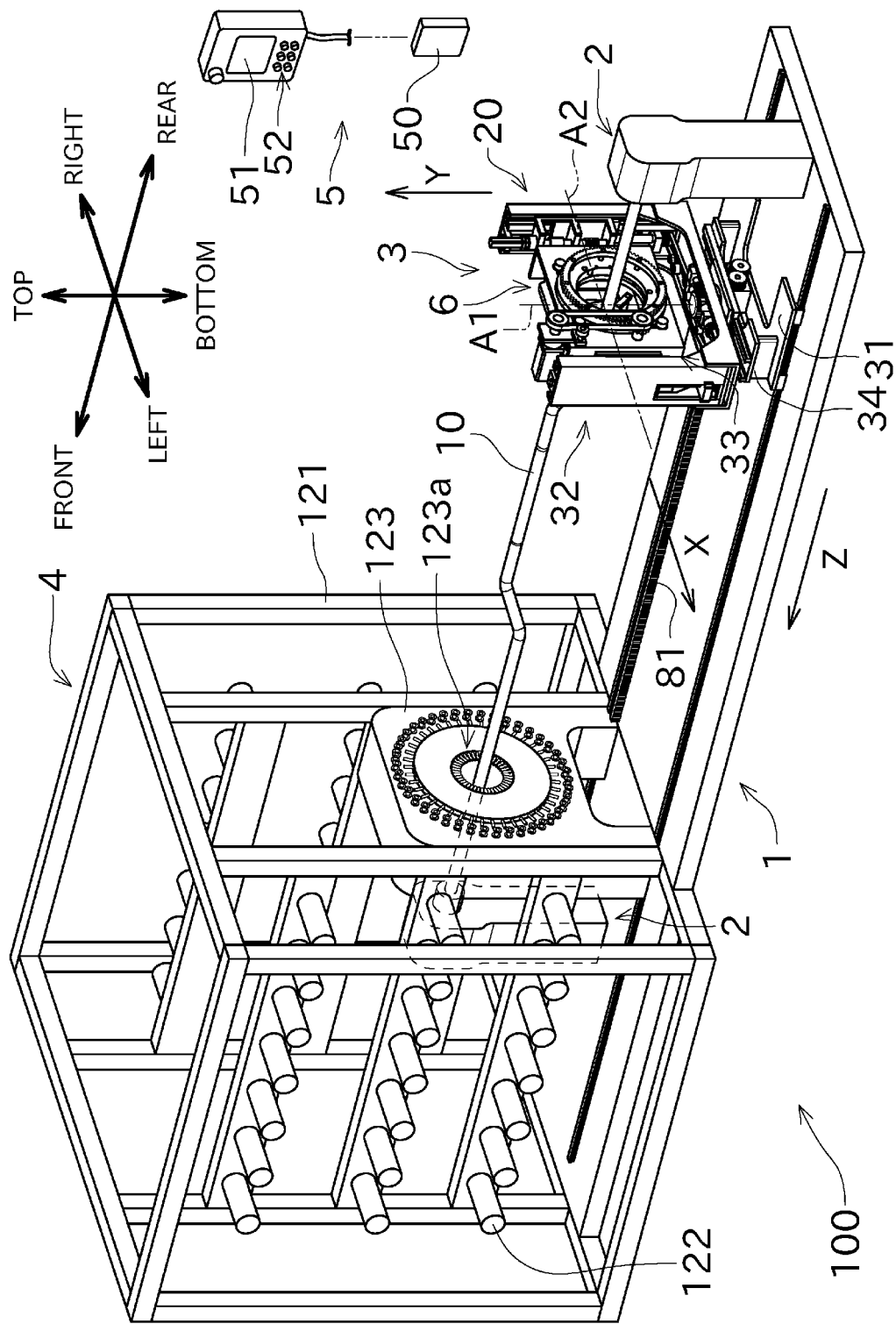
FIG. 1 is a perspective view showing an overall configuration of a filament winding apparatus according to a first example.

DESCRIPTION OF THE REFERENCE NUMERALS 2 core material support device
3 supplying device
5 control device
10 core material
11 rail
20 moving part
32 main frame (first member)
39 carriage frame (second member)
39a opening (passage opening portion)
60 opening portion
91 front-rear traveling drive motor (first drive source)
92 left-right traveling drive motor (second drive source)
93 turn drive motor (third drive source)
94 lifting motor (sixth drive source)
95 pitching drive motor (fifth drive source)
96 core material rotary drive motor (seventh drive source)
100 filament winding apparatus
111 rotary drive motor (fourth drive source)
152 large diameter aligning guide part (upstream side fiber bundle guide)
152a opening (second opening portion)
153 small diameter aligning guide part (fiber bundle guide)
153a opening (opening portion)
162 tightening fiber bobbin supporting part (tightening material bobbin supporting part)
164 winding guide (tightening material guide)
A1 rotational axis (first rotational axis)
A2 pitching axis (second rotational axis)
A4 supporting axis (axis)
F fiber bundle
F1 tightening fiber bundle (tightening material)

DETAILED DESCRIPTION

Figure 2:
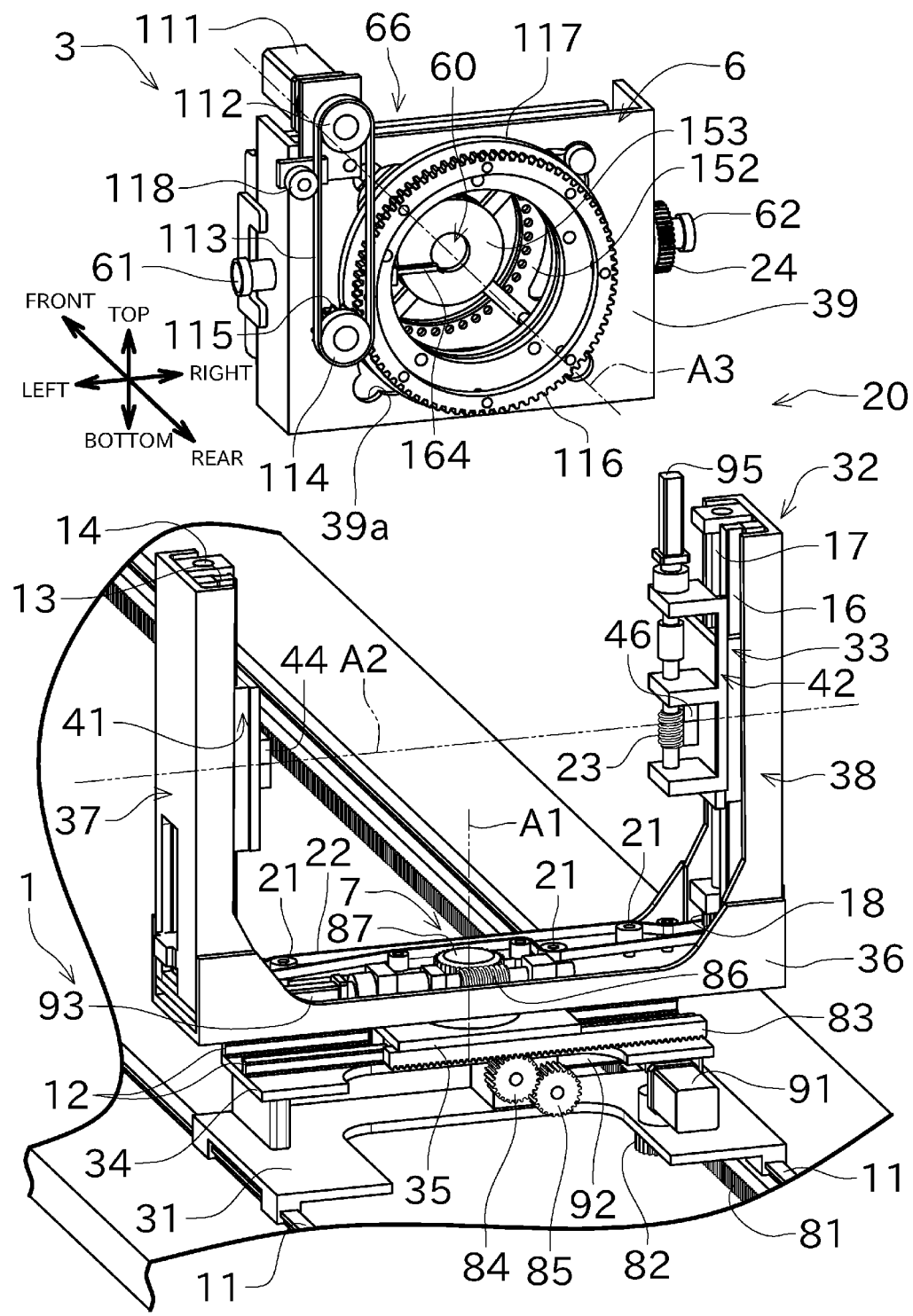
FIG. 2 is an exploded perspective view showing a supplying device viewed from the rear.

Next, an example of our winding apparatus will be described with reference to the drawings. FIG. 1 is a perspective view showing an overall configuration of a filament winding apparatus 100 according to a first example. FIG. 2 is an exploded perspective view showing a supplying device 3 viewed from the rear.

As shown in FIG. 1, the filament winding apparatus 100 according to a first example includes a travel base 1, core material support devices 2, a supplying device 3, a creel stand 4, and a control device 5.

"Front" in the following description means on the creel stand 4 side relative to the supplying device 3. "Rear" in the following description means on the opposite side of the creel stand 4 relative to supplying device 3. "Left" and "Right" mean a left side and a right side when facing the front. The definition of these directions is for conveniently describing a positional relationship or the like between components. An orientation or the like for arranging the filament winding apparatus 100 is not limited.

As described later, the core material 10 has a curved shape, but a front-rear direction (first direction) is a direction substantially along an overall longitudinal direction of the core material 10. A left-right direction (second direction) is orthogonal to the front-rear direction. A vertical direction (third direction) is orthogonal to the front-rear direction and the left-right direction, respectively.

The travel base 1 is elongated in the front-rear direction. The travel base 1 supports the core material support devices 2, the supplying device 3 and the like from below in the vertical direction. The travel base 1 includes rails 11 extending in the front-rear direction. Rails 11 are provided on an upper surface of the travel base 1. The supplying device 3 is mounted to the rails 11 to move back and forth in the front-rear direction along the rails 11.

The core material support devices 2 support the core material 10. Two core material support devices 2 are arranged side by side with a predetermined distance in the front-rear direction. The two core material support devices 2 are arranged to face each other. Each of core material support devices 2 is fixed to the travel base 1.

The two core material support devices 2 support the core material 10 such that an intermediate portion in a longitudinal direction of the core material 10 is raised above the travel base 1. One of the two core material support devices 2 supports a front end (one end in the longitudinal direction) of the core material 10, and the other core material support device 2 supports a rear end (the other end in the longitudinal direction) of the core material 10.

When the two core material support devices 2 support the core material 10, the core material 10 basically extends in the front-rear direction. An appropriate gap is formed in the vertical direction between the upper surface of the travel base 1 and the core material 10 supported by the two core material support devices 2.

The core material 10 has an elongated shape, for example, a rod-like shape with a circular cross section. In this example, the core material 10 has a curved shape such that its longitudinal direction varies three-dimensionally.

The supplying device 3 is configured as a device that supplies fiber bundles onto the outer peripheral surface of the core material 10, while traveling along the rails 11. The fiber bundle is made of, for example, fiber materials such as carbon fiber. The fiber bundle may be impregnated with liquid resin (for example, uncured thermosetting resin).

The supplying device 3 performs a 0° winding of the fiber bundles to the core material 10. The 0° winding means an arranging method in which the fiber bundles are arranged onto the outer peripheral surface of the core material 10 in a direction in parallel with an axial direction of the core material 10. Although the fiber bundles do not circulate around the core material, this arrangement of the fiber bundles can also be considered to be included in the "winding." When the 0° winding is performed, the direction of the fiber bundles with respect to the core material 10 may be slightly inclined to the axial direction of the core material 10.

As described in detail below, a tightening fiber bundle (tightening material) is wound around the fiber bundles attached to the core material 10 from the outside by the supplying device 3 to tighten.

As shown in FIG. 1, the supplying device 3 is provided, on the travel base 1, between the two core material support devices 2. While the supplying device 3 moves back and forth in the front-rear direction along the rails 11, the supplying device 3 keeps a state in which the core material 10 supported by the two core material support devices 2 penetrates the supplying device 3.

Figure 3:
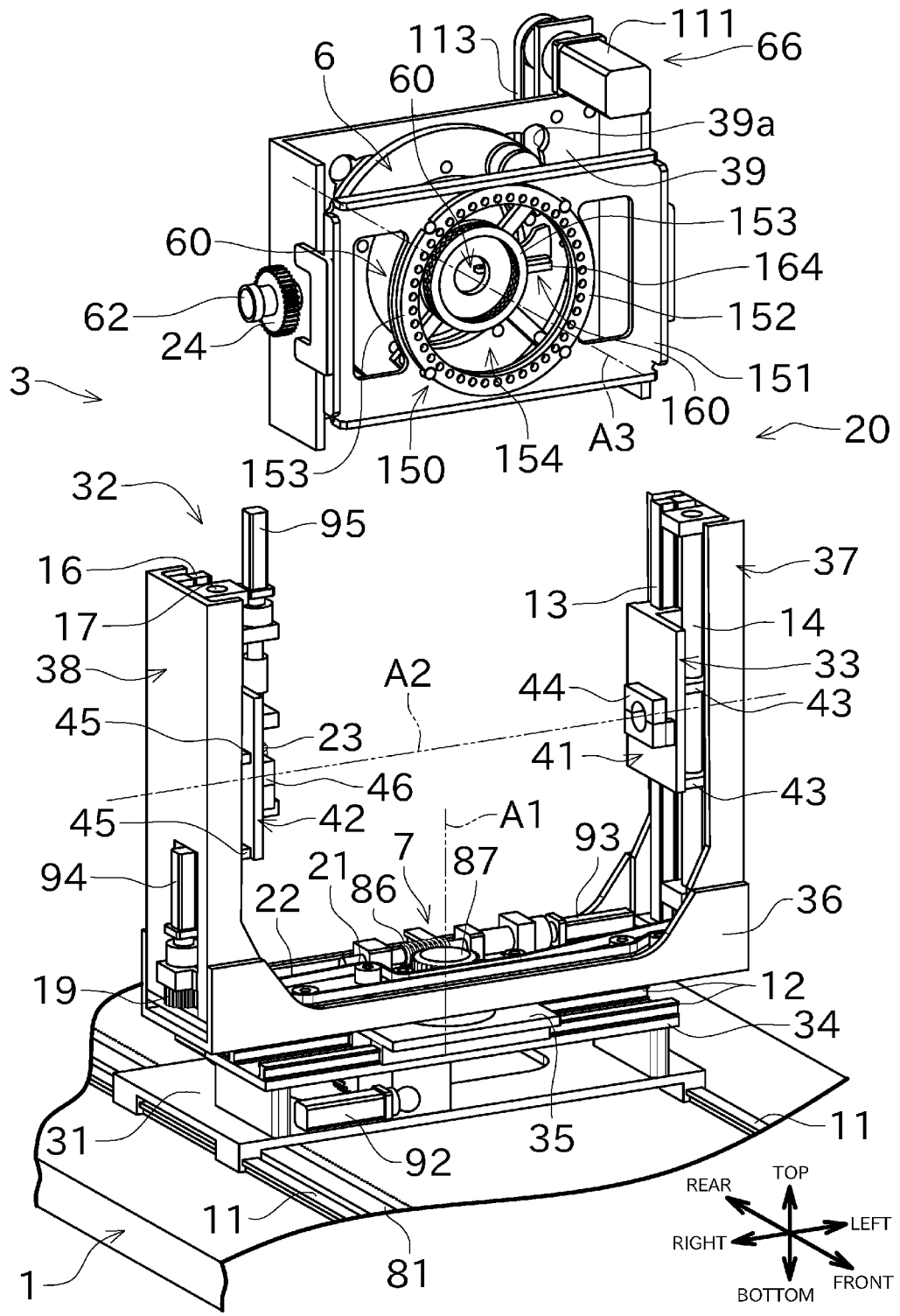
FIG. 3 is an exploded perspective view showing a supplying device viewed from the front.

As shown in FIGS. 2 and 3, the filament winding apparatus 100 includes a front-rear traveling drive motor (first drive source) 91, a left-right traveling drive motor (second drive source) 92, a turn drive motor (third drive source) 93, a rotary drive motor (fourth drive source) 111, a pitching drive motor (fifth drive source) 95, and a lifting motor (sixth drive source) 94. Each component in the supplying device 3 is driven by each of the above-described drive motors. Details of a configuration for driving will be described later.

The creel stand 4 illustrated in FIG. 1 supplies the plurality of the fiber bundles to the supplying device 3. In this example, the creel stand 4 includes a support frame 121, a plurality of bobbin supporting parts 122, and an aligning guide 123. The creel stand 4 is drawn in a simplified manner in FIG. 1 for avoiding complication of drawing.

The support frame 121 is a frame-shaped structure. One of the two core material support devices 2 is arranged within the creel stand 4 and at a center portion in the left-right direction of the support frame 121.

A large number of bobbin supporting parts 122 are arranged in the support frame 121. Bobbin (not shown) can be set to each of bobbin supporting parts 122. The fiber bundle to be supplied to the supplying unit 6 is pre-wound onto the Bobbin. In FIGS. 1 to 3, the fiber bundle is not shown.

The aligning guide 123 is mounted on a surface of the support frame 121 on a side close to the supplying device 3. The aligning guide 123 has an opening 123*a* through which the core material 10 can pass. Various guide members which guide the fiber bundles are mounted to the aligning guide 123 around the opening 123*a*. Examples of the guide members include a roller.

The control device 5 including a controller 50, a display 51, and an operation part 52, controls operations of each component in the supplying device 3.

The controller 50 is configured as a control board, for example. The controller 50 is electrically connected to the above-described drive motors for driving each component of the supplying device 3. The controller 50 controls each drive motor in accordance with operations of the operation part 52.

The display 51 can display various information regarding a winding work (for example, conditions such as the speed of winding the fiber bundles, a progress of the winding work or the like).

The operation part 52 is used for manually controlling the front-rear traveling drive motor 91, the left-right traveling drive motor 92, the turn drive motor 93, the lifting motor 94, the pitching drive motor 95, and a rotary drive motor 111, or used for inputting various winding information.

Next, details of the supplying device 3 will be described with reference to FIGS. 2 and 3.

As shown in FIGS. 2 and 3, the supplying device 3 includes a supplying unit 6 and a moving part 20.

The supplying unit 6 realizes the functions of the 0° winding and tightening as described above. The detailed configuration of the supplying unit 6 will be described later.

The supplying unit 6 is mounted to the moving part 20. The moving part 20 can change variously a position and a direction at which the supplying unit 6 supplies the fiber bundles to the outer peripheral surface of the core material 10, in accordance with a shape of the core material 10.

The moving part 20 includes a base frame 31, a main frame (first member) 32, a lifting frame 33, and a carriage frame (second member) 39.

As shown in FIG. 2, the base frame 31 made of a plate-shaped member, is arranged with its thickness direction facing up and down. The base frame 31 is mounted to move in the front-rear direction along the rails 11 provided on the upper surface of the travel base 1. The base frame 31 is driven to move back and forth in the front-rear direction by a linear motion mechanism including the front-rear traveling drive motor 91 and a rack and pinion.

Specifically, a front-rear traveling rack 81 extending in the front-rear direction is arranged on the upper surface of the travel base 1. The front-rear traveling rack 81 is fixed to the travel base 1. The front-rear traveling rack 81 has tooth for meshing with the front-rear traveling pinion 82.

The front-rear traveling pinion 82 is rotatably supported below the base frame 31. The front-rear traveling pinion 82 is driven in rotation by the front-rear traveling drive motor 91 provided on the upper surface of the base frame 31.

The front-rear traveling drive motor 91 drives the front-rear traveling pinion 82 in rotation. The front-rear traveling pinion 82 to be rotated moves in the front-rear direction to roll with respect to the front-rear traveling rack 81. As a result, the base frame 31 (and thus the moving part 20) moves in the front-rear direction.

A support base 34 for supporting the main frame 32 is provided across an upper surface of the base frame 31. The support base 34 is formed in a substantially U-shape with its lower side open, as viewed in the front-rear direction. Left and right rails 12 extending in the left-right direction are provided on the upper surface of the support base 34.

The main frame 32 is formed in a substantially U-shape with its upper side open, as viewed in the front-rear direction. The main frame 32 arranged above the support base 34 is mounted to the support base 34. The main frame 32 can move back and forth in the left-right direction along the left and right rails 12 provided on the upper surface of the support base 34. The main frame 32 is rotatable around a rotational axis (first rotational axis) A1 extending in the vertical direction, with respect to the support base 34.

The main frame 32 supports the carriage frame 39 rotatably around a pitching axis (second rotational axis) A2 extending in the left-right direction. As a result, the supplying unit 6 placed at the carriage frame 39 is rotated. In the following description, a turning of the supplying unit 6 around the pitching axis A2 may be refereed as "pitching."

The main frame 32 includes a left-right traveling base 35, a base 36, a left arm 37, and a right arm 38.

The left-right traveling base 35 has a plate shape. The left-right traveling base 35 is mounted to move along the left and right rails 12 provided on the upper surface of the support base 34. A left-right traveling rack 83 is fixed on a lower surface of the left-right traveling base 35. The left-right traveling rack 83 has tooth for meshing with a left-right traveling pinion 84.

The left-right traveling pinion 84 is provided above the base frame 31 and below the support base 34. The left-right traveling pinion 84 is supported to be rotated around an axis extending in the front-rear direction. The left-right traveling pinion 84 meshes with a first gear 85 and is driven in rotation due to rotation of the first gear 85.

As shown in FIGS. 2 and 3, the first gear 85 is driven in rotation by the left-right traveling drive motor 92 provided on the upper surface of the base frame 31. The first gear 85 meshes with the left-right traveling pinion 84, and then transmits a rotation driving force from the left-right traveling drive motor 92 to the left-right traveling pinion 84.

The left-right traveling drive motor 92 causes the left-right traveling pinion 84 to be rotated via the first gear 85. The left-right traveling pinion 84 to be rotated feeds the tooth of the left-right traveling rack 83 toward left and right. As a result, the left-right traveling base 35 (and thus the main frame 32) is moved to the left-right direction.

The elongated base 36 is arranged above the left-right traveling base 35. The base 36 is supported by the left-right traveling base 35 to be rotated around the rotational axis (first rotational axis) A1 extending in the vertical direction. As the left-right traveling base 35 moves in the left-right direction, the rotational axis A1 accordingly moves in the left-right direction. When the base 36 is not rotated around the rotational axis A1, a longitudinal direction of the base 36 coincides with the left-right direction. That is, when the base 36 is positioned to extend in the left-right direction, a rotation angle θV of the base 36 is 0°. A positional relationship between components will be described, on the basis of a state in which the rotation angle θV of the base 36 is 0°.

The base 36 is formed in a substantially U-shape with its upper side open, as viewed in the left-right direction. The turn drive motor 93 and a worm gear mechanism 7 are provided on the upper surface of the base 36. The worm gear mechanism 7 includes a worm 86 and a worm wheel 87 meshing with the worm 86.

The worm 86 is supported to be rotated around an axis extending in a direction parallel to the longitudinal direction of the base 36. The worm 86 is driven in rotation by the turn drive motor 93. Screw tooth for meshing with the tooth on an outer peripheral of the worm wheel 87 are formed on an outer peripheral surface of the worm 86.

The worm wheel 87 is supported on the upper surface of the base 36 to be rotated around the rotational axis A1. The worm wheel 87 is mounted to not be rotated relative to the left-right traveling base 35.

The turn drive motor 93 drives the worm 86 in rotation. The worm 86 to be rotated tries to feed the tooth of the worm wheel 87, but the worm wheel 87 cannot be rotated relative to the left-right traveling base 35. Therefore, along with rotation of the worm 86, the base 36 is rotated around the rotational axis A1 with respect to the worm wheel 87 and the left-right traveling base 35.

In the filament winding apparatus 100 of this example, the base 36 (main frame 32) can be rotated within an range of the angle ±100°. That is, the rotation angle θV that is an angle defined by the longitudinal direction and the left-right direction of the base 36, meets a condition of −100°≤θV≤100°. Accordingly, even when the core material 10 has a portion substantially parallel to the left-right direction, the supplying unit 6 can be oriented along such portion.

The left arm 37 is formed in a substantially U-shape, as viewed in the vertical direction. The left arm 37 arranged at a left end portion of the base 36 is provided to protrude upward from the base 36. A left vertical rail 13 is provided inside the left arm 37 to extend in the vertical direction. Inside of the left arm 37, a left screw feeding shaft 14 is rotatably supported with its axial direction being oriented to the vertical direction.

The right arm 38 is formed in a substantially U-shape, as viewed in the vertical direction. The right arm 38 arranged at a right end portion of the base 36 is provided to protrude upward from the base 36. A right vertical rail 16 is provided inside the right arm 38 to extend in the vertical direction.

Inside the right arm 38, a right screw feeding shaft 17 is rotatably supported with its axial direction being oriented to the vertical direction.

As shown in FIG. 2, a right rotary drive gear 18 is mounted to a lower portion of the right screw feeding shaft 17 to not be rotated relative to the right screw feeding shaft 17. The right rotary drive gear 18 meshes with a lifting drive gear 19 (see FIG. 3) that is driven in rotation by the lifting motor 94. The right rotary drive gear 18 is driven in rotation along with rotation of the lifting drive gear 19.

As shown in FIG. 3, the lifting motor 94 is provided below the right arm 38. The lifting motor 94 drives the lifting drive gear 19 which meshes with the right rotary drive gear 18 in rotation. As a result, the right screw feeding shaft 17 is rotated.

A toothed pulley (not shown) is mounted at a lower end of the left screw feeding shaft 14 and at a lower end of right screw feeding shaft 17 respectively to not be rotated relative to each other. Rotation of the right screw feeding shaft 17 is transmitted to the left screw feeding shaft 14 via transmission pulleys 21 provided upward of the base 36, and a toothed belt 22. Accordingly, due to driving of the lifting motor 94, the left screw feeding shaft 14 and the right screw feeding shaft 17 are simultaneously rotated around their respective shaft centers in the same orientation and at the same speed.

The lifting frame 33 is provided to move in the vertical direction with respect to the left arm 37 and the right arm 38. The lifting frame 33 includes a left lifting base 41 and a right lifting base 42. The left lifting base 41 and the right lifting base 42 are moved up and down while always keeping the same height as each other.

As shown in FIG. 3, the left lifting base 41 is mounted to move up and down along the left vertical rail 13 provided at the left arm 37. The left lifting base 41 includes left screw coupling parts 43. The left lifting base 41 is screw-coupled to the left screw feeding shaft 14 via the left screw coupling parts 43. Accordingly, in conjunction with rotation of the left screw feeding shaft 14, the left lifting base 41 is moved in the vertical direction.

A left rotation arm supporter 44 is provided on a right side surface of the left lifting base 41. The left rotation arm supporter 44 supports a left rotation arm 61 which is provided on the left side of the carriage frame 39.

As shown in FIG. 2, the right lifting base 42 is mounted to move up and down along the right vertical rail 16 provided at the right arm 38. As shown in FIG. 3, the right lifting base 42 includes right screw coupling parts 45. The right lifting base 42 is screw-coupled to the right screw feeding shaft 17 via the right screw coupling parts 45. Accordingly, in conjunction with rotation of the right screw feeding shaft 17, the right lifting base 42 is moved in the vertical direction.

A right rotation arm supporter 46 is provided on a left side surface of the right lifting base 42. The right rotation arm supporter 46 supports a right rotation arm 62 which is provided on the right side of the carriage frame 39.

The right rotation arm supporter 46 is provided to face to the left rotation arm supporter 44 in the left-right direction. The pitching axis A2 is arranged to pass through the right rotation arm supporter 46 and the left rotation arm supporter 44. The pitching axis A2 passes through respective centers of the left rotation arm supporter 44 and the right rotation arm supporter 46, as viewed in the left-right direction.

The right lifting base 42 supports a pitching drive motor 95 and a carriage rotation worm 23.

The carriage rotation worm 23 is rotatably supported by a shaft arranged coaxially with a rotational axis of the pitching drive motor 95. The carriage rotation worm 23 is driven in rotation by the pitching drive motor 95. Screw tooth that meshes with a tooth on an outer peripheral of a carriage rotation worm wheel 24 mounted to the carriage frame 39, are formed on an outer peripheral surface of the carriage rotation worm 23.

The carriage frame 39 is made of a plate-like member. The carriage frame 39 is formed in a U-shape with its front open, as viewed in the vertical direction.

As shown in FIG. 2, the left rotation arm 61 protruding outward is mounted on a left side surface of the carriage frame 39. A right rotation arm 62 protruding outward is mounted on a right side surface of the carriage frame 39.

The left rotation arm 61 and the right rotation arm 62 are provided symmetrically in a substantially center part in the vertical direction of the carriage frame 39. The left rotation arm 61 is rotatably supported by the left rotation arm supporter 44. The right rotation arm 62 is rotatably supported by the right rotation arm supporter 46. That is, the carriage frame 39 is supported to be rotated around the pitching axis A2 with respect to the lifting frame 33 via the left rotation arm 61 and the right rotation arm 62. Along with a vertical motion of the lifting frame 33, the pitching axis A2 is also moved up and down. A pitching angle θH of the carriage frame 39 with an upright posture, is 0°. In the following, a positional relationship between components will be described as the basis of a state in which the pitching angle θH of the carriage frame 39 is 0°.

The carriage rotation worm wheel 24 is mounted to the right rotation arm 62 to not be rotated relative to each other. In a state in which the carriage frame 39 is mounted to the lifting frame 33, the carriage rotation worm wheel 24 meshes with the carriage rotation worm 23 supported by the right lifting base 42.

The pitching drive motor 95 drives the carriage rotation worm 23 in rotation. Since the carriage rotation worm 23 to be rotated feeds the tooth of the carriage rotation worm wheel 24, the carriage rotation worm wheel 24 is rotated. Accordingly, the carriage frame 39 turn up and down around the pitching axis A2.

In the filament winding apparatus 100 of this example, the carriage frame 39 can turn up and down within a range of the angle ±100°. That is, if the pitching angle θH is 0°, the pitching angle θH in a state in which the carriage frame 39 extends in the vertical direction as viewed in the left-right direction, such pitching angle θH meets a condition of −100°≤θH≤100°. Accordingly, even when the core material 10 has a portion substantially parallel to the vertical direction, the supplying unit 6 can be oriented along such portion.

Figure 4:
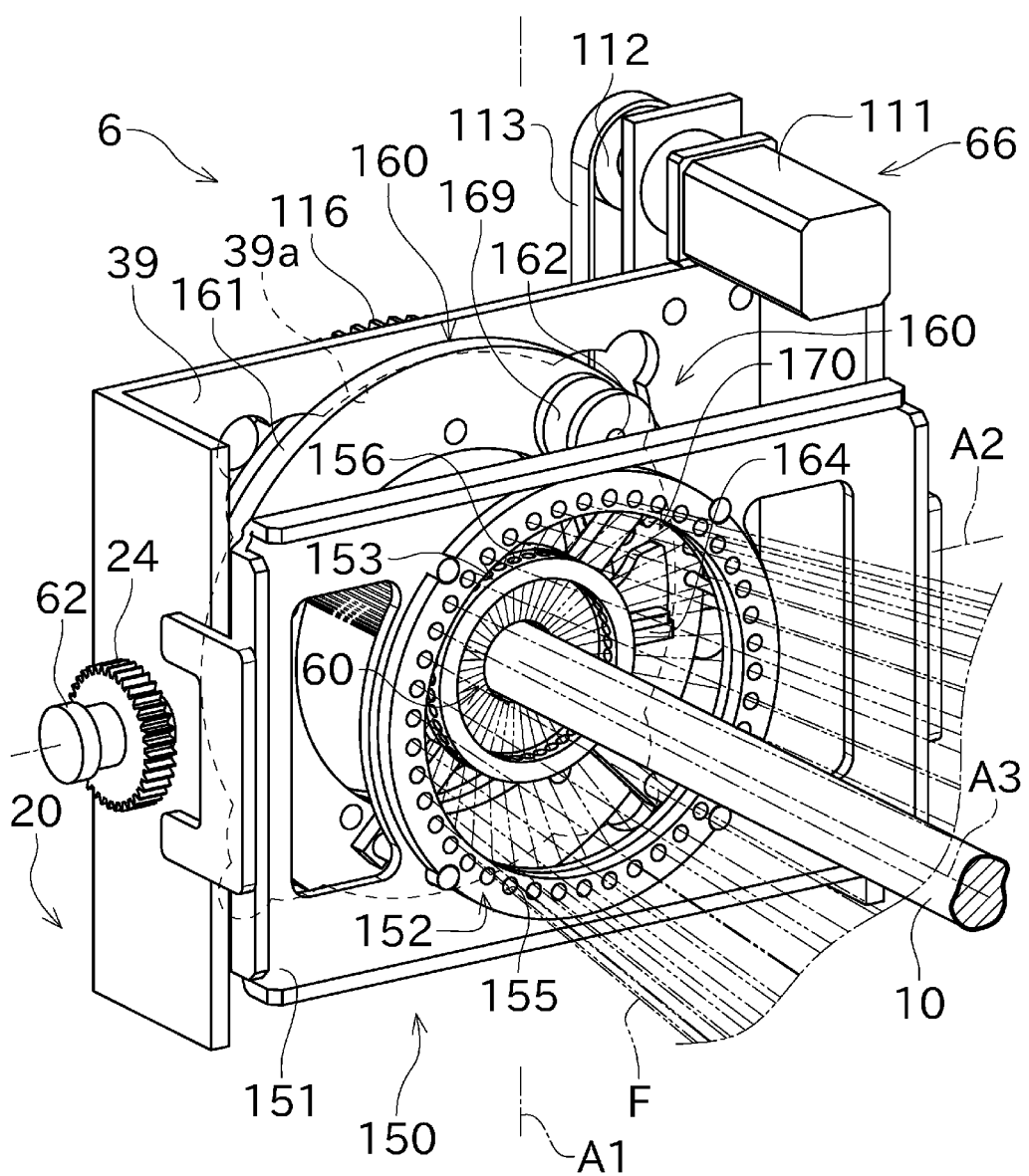
FIG. 4 is a perspective view showing a configuration of the supplying unit that performs a 0° winding.
Figure 5:
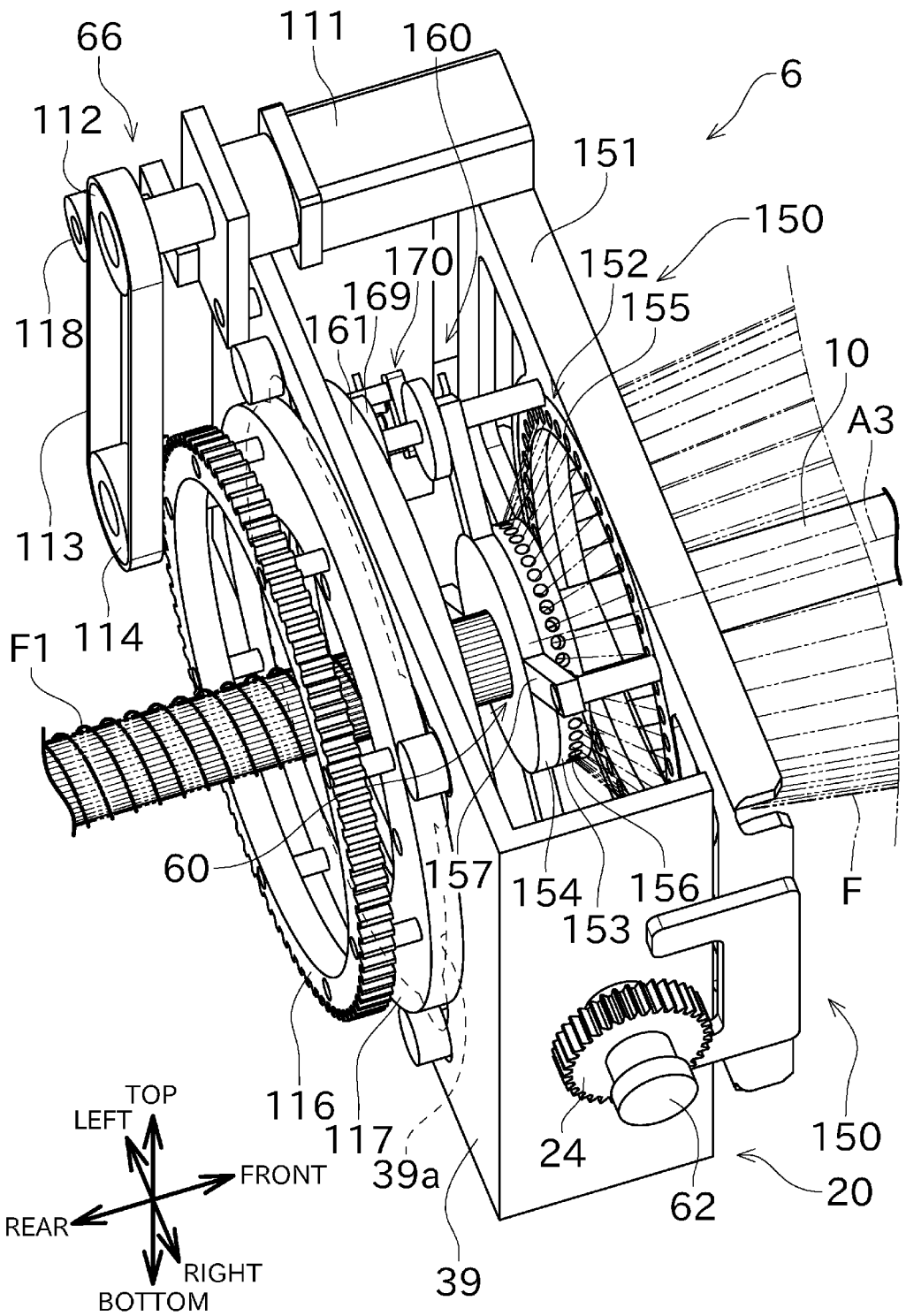
FIG. 5 is a perspective view showing a configuration of the supplying unit.
Figure 6:
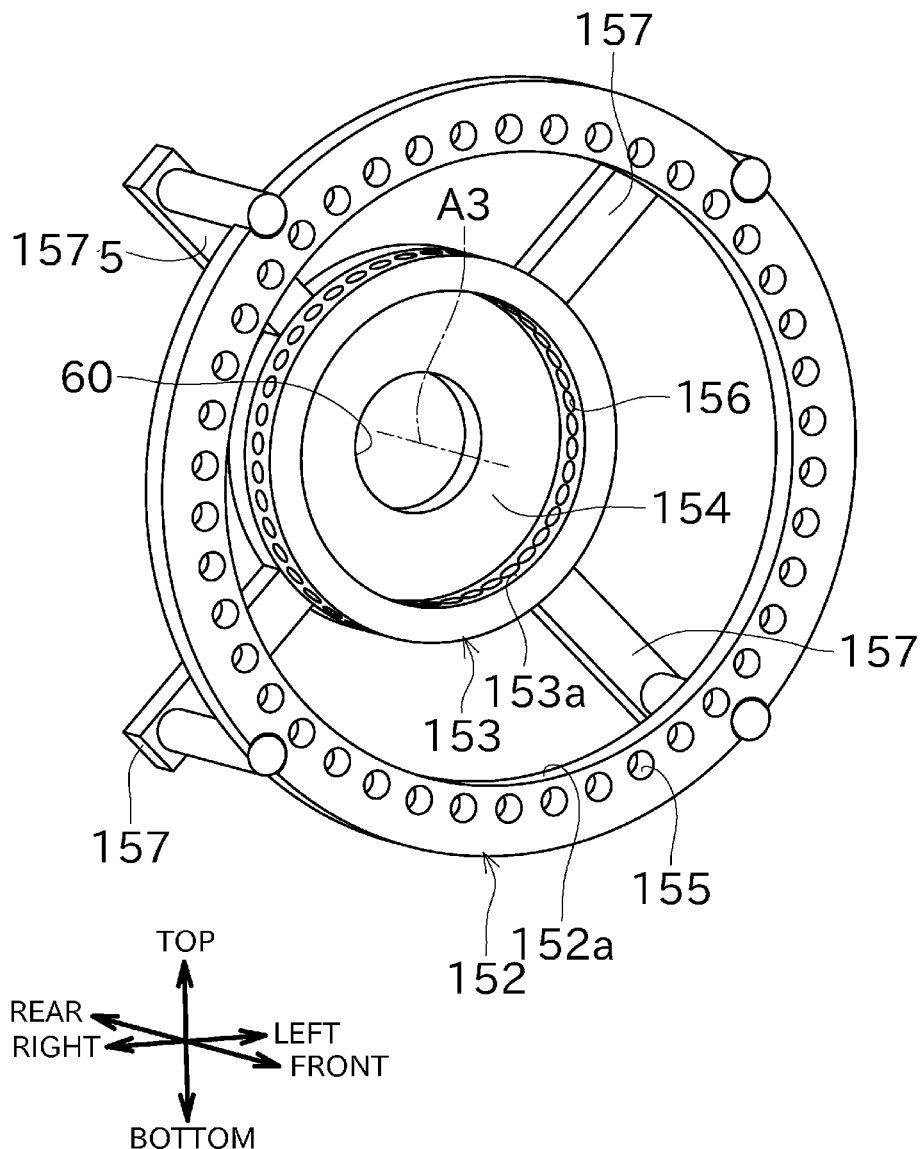
FIG. 6 is a perspective view showing configurations of a large diameter aligning guide part, a small diameter aligning guide part, and an inner circumference guide part.
Figure 7:
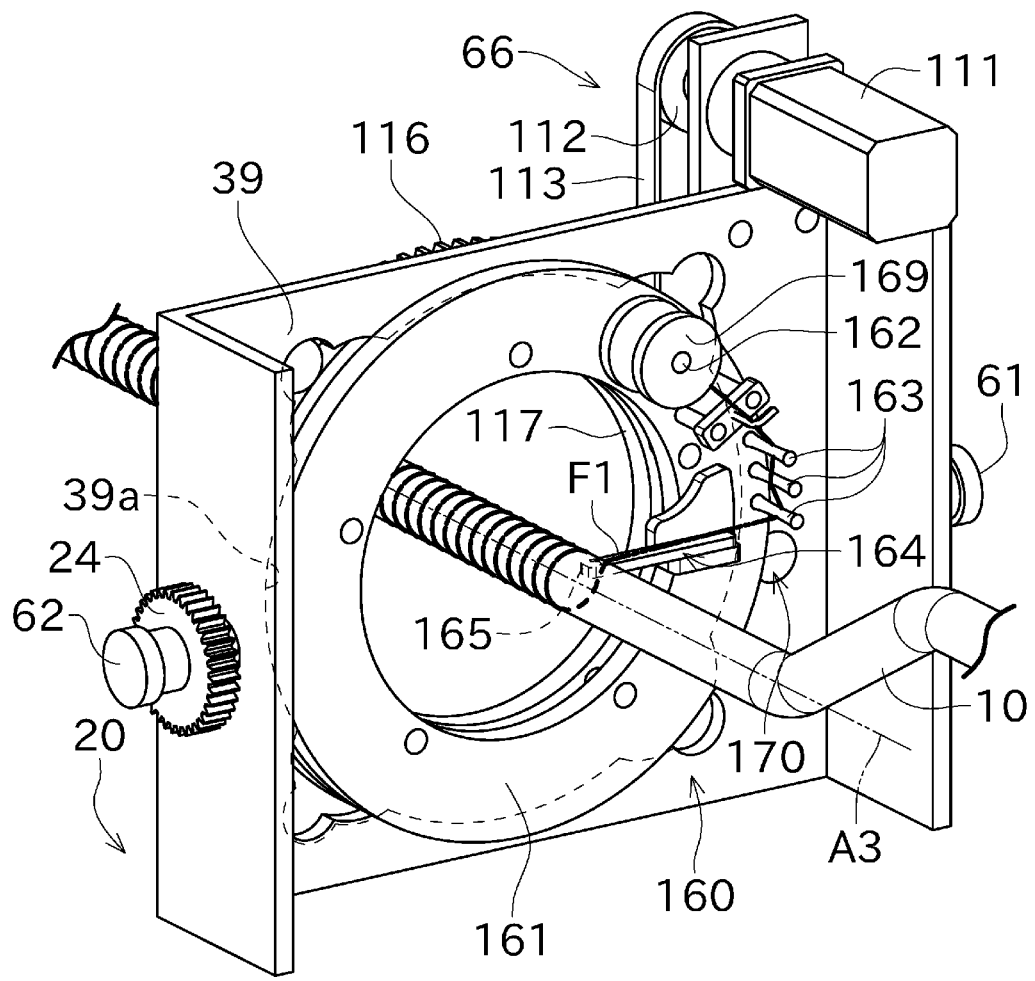
FIG. 7 is a perspective view showing a configuration of a tightening part.
Figure 7:
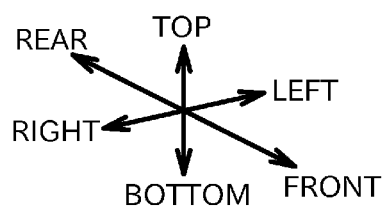

Next, the supplying unit 6 will be described in detail. FIGS. 4 and 5 are perspective views showing a configuration of the supplying unit 6 which performs the 0° winding. FIG. 6 is a perspective view showing a configuration of a fixed fiber bundle guiding part 150 of the supplying unit 6. FIG. 7 is a perspective view showing a configuration of a tightening part 160.

The supplying unit 6 is configured as a 0° winding unit performs the 0° winding with respect to the core material 10. The supplying unit 6 has an opening portion (opening) 60 as viewed in the front-rear direction. The opening portion 60 allows the core material 10 to pass through its center. The opening portion 60 is formed to penetrate the supplying unit 6 in the front-rear direction.

The supplying unit 6 is arranged at the carriage frame 39 provided in the moving part 20. The carriage frame 39 has, as viewed in the front-rear direction, a substantially circular large opening 39a (passage opening portion). The opening 39a allows the core material 10 to pass through. The opening portion 60 of the supplying unit 6 is connected with the opening 39a of the carriage frame 39.

As shown in FIGS. 4 and 5, the supplying unit 6 includes a fixed fiber bundle guiding part 150, a tightening part 160, and a tightening drive part 66.

The fixed fiber bundle guiding part 150 is fixed to the carriage frame 39. The fixed fiber bundle guiding part 150 guides the plurality of the fiber bundles F to the outer peripheral surface of the core material 10 to be arranged at an appropriate interval in the circumferential direction of the core material 10. Each of the plurality of the fiber bundles F is arranged on the outer peripheral surface of the core material 10 in a direction parallel to the axial direction of the core material 10.

As shown in FIG. 5, the fixed fiber bundle guiding part 150 includes a mounting frame 151, a large diameter aligning guide part (upstream side fiber bundle guide) 152, a small diameter aligning guide part (fiber bundle guide) 153, and an inner circumference guide part 154.

The mounting frame 151 is made of a plate-shaped member. The mounting frame 151 is mounted at the front portion of the carriage frame 39, with its thickness direction facing in the front-rear direction. The large diameter aligning guide part 152 is fixed at the center of the mounting frame 151. The mounting frame 151 and the large diameter aligning guide part 152 may be integrally formed.

As shown in FIG. 6, the large diameter aligning guide part 152 is formed in a substantially annular shape having a circular opening 152a through which the core material 10 can pass. The center of the opening 152a is aligned with a winding rotation axis A3. The large diameter aligning guide part 152 is arranged on the front side of the small diameter aligning guide part 153 (in other words, the upstream side in the direction of traveling of the fiber bundles F). The large diameter aligning guide part 152 is provided at the mounting frame 151 such that its axial direction is oriented to the front-rear direction.

A plurality of front guiding holes 155 are formed at the large diameter aligning guide part 152 to penetrate the large diameter aligning guide part 152 in the front-rear direction (thickness direction). The front guiding holes 155 are arranged side by side at equal intervals in the circumferential direction of the large diameter aligning guide part 152. The fiber bundles F pass through the respective front guiding holes 155.

The small diameter aligning guide part 153 is made of an annular plate having a predetermined thickness in an axial direction. The small diameter aligning guide part 153 is arranged on the rear side of the large diameter aligning guide part 152 with a predetermined distance in the front-rear direction with respect to the large diameter aligning guide part 152. The small diameter aligning guide part 153 is arranged coaxially with the large diameter aligning guide part 152. The small diameter aligning guide part 153 has a circular opening 153a through which the core material 10 can pass. The center of the opening 153a is aligned with a winding rotation axis A3.

As shown in FIG. 6, an outer diameter of the small diameter aligning guide part 153 is smaller than an inner diameter of the large diameter aligning guide part 152. An opening area of the opening (opening portion) 153a at the center of the small diameter aligning guide part 153 is smaller than an opening area of the opening (second opening portion) 152a at the center of the large diameter aligning guide part 152. The small diameter aligning guide part 153 is fixed on a front surface of the inner circumference guide part 154.

A plurality of rear guiding holes 156 are formed in the small diameter aligning guide part 153 to penetrate the small diameter aligning guide part 153 in a radial direction. The rear guiding holes 156 are arranged in correspondence with the number of front guiding holes 155. The rear guiding holes 156 are arranged side by side at equal intervals in the circumferential direction of the small diameter aligning guide part 153. The fiber bundles F pass through the respective rear guiding holes 156. Each of the rear guiding holes 156 guides the fiber bundle F guided from each of the front guiding holes 155 to the center side of the small diameter aligning guide part 153.

As shown in FIG. 6, the inner circumference guide part 154 is made of an annular plate. The circular through hole formed in the center of the inner circumference guide part 154 is substantially equivalent to the opening portion 60 of the supplying unit 6. A plurality of support plates 157 (four support plates 157, in this example) are fixed on the inner circumference guide part 154. Each of support plates 157 extends outward in the radial direction of the inner circumference guide part 154. The inner circumference guide part 154 is mounted to the mounting frame 151 via the support plates 157. The inner circumference guide part 154 is connected to the rear surface of the small diameter aligning guide part 153. The inner circumference guide part 154 supports the small diameter aligning guide part 153 such that it is arranged coaxially with the large diameter aligning guide part 152.

The inner circumference guide part 154 is formed to have substantially the same size as the small diameter aligning guide part 153. An inner diameter of the inner circumference guide part 154 is smaller than an inner diameter of the small diameter aligning guide part 153 and slightly larger than an outer diameter of the core material 10. Accordingly, a circular gap through which the fiber bundles F pass is formed between an inner peripheral surface of the inner circumference guide part 154 and the core material 10 penetrating the inner circumference guide part 154.

In the fixed fiber bundle guiding part 150 configured as described above, the plurality of the fiber bundles F from the creel stand 4 shown in FIG. 1 pass respectively the front guiding holes 155 which are formed in the large diameter aligning guide part 152, as shown in FIGS. 4 and 5. Accordingly, the fiber bundles F are aligned to be arranged side by side in a circumferential direction of the large diameter aligning guide part 152.

Thereafter, each of fiber bundles F passes the rear guiding hole 156 of the small diameter aligning guide part 153. The rear guiding holes 156 are formed corresponding to the front guiding holes 155. Accordingly, the fiber bundles F are guided to approach the outer periphery of the core material 10, while keeping the state in which the fiber bundles F are arranged in a circular manner. That is, the plurality of the fiber bundles F that have passed through the small diameter aligning guide part 153 are arranged in a small circular manner.

Thereafter, the plurality of the fiber bundles F pass through the circular gap between the inner circumference guide part 154 and the core material 10. As a result, the fiber bundles F are aligned preferably along the axial direction of the core material 10.

The tightening part 160 is provided rearward of the fixed fiber bundle guiding part 150. The tightening part 160 is arranged side by side in the front-rear direction with the fixed fiber bundle guiding part 150. The tightening part 160 tightens the fiber bundles F which are guided by the fixed fiber bundle guiding part 150 and arranged on the outer peripheral surface of the core material 10, by winding a tightening fiber bundle (tightening material) F1.

The tightening fiber bundle F1 can be made of, as well as the fiber bundles F, fiber materials such as carbon fiber, for example. The tightening fiber bundle F1 may be impregnated with liquid resin (for example, uncured thermosetting resin).

The tightening part 160 is arranged at a front surface of the carriage frame 39 (the side opposite to a transmission mechanism of the tightening drive part 66 across the carriage frame 39). As shown in FIG. 7, the tightening part 160 includes a rotary plate 161, a tightening fiber bobbin supporting part (tightening material bobbin supporting part) 162, and a tightening fiber guiding part (tightening material guiding part) 170.

The rotary plate 161 made of an annular plate is provided rearward of the inner circumference guide part 154. The rotary plate 161 is arranged coaxially with a rotary base member 117, the inner circumference guide part 154, the small diameter aligning guide part 153, and the large diameter aligning guide part 152.

As shown in FIG. 5, the rotary plate 161 is arranged at the side opposite to the rotary base member 117 across the carriage frame 39. The rotary plate 161 is mounted to the rotary base member 117 to not be rotated relatively. The rotary plate 161 is rotated around the winding rotational axis A3 in FIG. 7 along with rotation of the rotary base member 117.

As shown in FIG. 7, the tightening fiber bobbin supporting part 162 is provided at an appropriate position in the circumferential direction of the rotary plate 161. The tightening fiber bobbin supporting part 162 is provided perpendicular to a front surface of the rotary plate 161 to protrude forward from the front surface of the rotary plate 161. The tightening fiber bobbin supporting part 162 supports a tightening fiber bobbin (tightening material bobbin) 169. A tightening fiber bundle F1 is wound onto the tightening fiber bobbin 169.

The tightening fiber guiding part 170 is arranged forward of the rotary plate 161. The tightening fiber guiding part 170 is supported by the rotary plate 161. The tightening fiber guiding part 170 is provided at the position apart from the winding rotational axis A3. The tightening fiber guiding part 170 is rotated around the winding rotational axis A3 along with rotation of the rotary plate 161.

The tightening fiber guiding part 170 guides the tightening fiber bundle F1 drawn from the tightening fiber bobbin 169 toward the outer peripheral surface of the core material 10. The tightening fiber guiding part 170 includes tension bars 163 and a winding guide (tightening material guide) 164.

A plurality of tension bars 163 (three tension bars in this example) are arranged at the rotary plate 161. Each of the tension bars 163 applies tension to the tightening fiber bundle F1 by rubbing with the tightening fiber bundle F1 wound onto the tension bar 163. The tightening fiber bundle F1 is wound around each tension bar 163 in order, and then guided to the winding guide 164.

The winding guide 164 is made of, for example, an elongated plate-shaped member. As shown in FIG. 7, one end of the winding guide 164 is fixed on the front surface of the rotary plate 161, and the other end thereof is provided at a position near the center of the rotary plate 161 (position near the core material 10). Accordingly, the winding guide 164 extends inside in a radial direction from the rotary plate 161.

In the winding guide 164, a tightening fiber bundle guide hole 165 is formed through in an end on a side close to the center of the rotary plate 161. The tightening fiber bundle guide hole 165 penetrates the winding guide 164 in a direction which is perpendicular to the axis of the rotary plate 161 and perpendicular to the radial direction of the rotary plate 161. The tightening fiber bundle F1 passes the tightening fiber bundle guide hole 165 and is guided to a position near the outer peripheral surface of the core material 10.

As the rotary plate 161 rotates, the tightening fiber bobbin supporting part 162 (and thus the tightening fiber bobbin 169) and the winding guide 164 rotate around the winding rotational axis A3 (that is, the core material 10). As a result, the tightening part 160 winds the tightening fiber bundle F1 in a direction tilted by a predetermined angle from the axial direction of the core material 10. The plurality of the fiber bundles F aligned on the outer peripheral surface of the core material 10 along the axial direction thereof are fixed on the outer peripheral surface of the core material by the tightening fiber bundle F1, as shown in FIG. 5.

The tightening drive part 66 is fixed to the carriage frame 39. The tightening drive part 66 drives the rotary plate 161 in rotation. As shown in FIG. 2, the tightening drive part 66 includes the rotary drive motor 111, a first transmission pulley 112, a transmission belt 113, a second transmission pulley 114, a transmission gear 115, a rotary gear 116, and the rotary base member 117.

The rotary drive motor 111 is provided upward of and on a left side of the carriage frame 39. The first transmission pulley 112 is mounted to an output shaft of the rotary drive motor 111 to not be rotated relatively.

The transmission belt 113 is wound around the first transmission pulley 112 and the second transmission pulley 114. The transmission belt 113 transmits rotation of the first transmission pulley 112 to the second transmission pulley 114. A tension roller 118 applying tension to the transmission belt 113 may be provided on the transmission belt 113.

The second transmission pulley 114 and the transmission gear 115 are rotatably supported by the carriage frame 39 on a lower left side of the carriage frame 39. The second transmission pulley 114 and the transmission gear 115 arranged side by side in the front-rear direction are provided to not be rotated relative to each other.

The rotary gear 116 is arranged on the rear side of the carriage frame 39. The rotary gear 116 meshes with the transmission gear 115 and is supported rotatably by the carriage frame 39 at a center of the carriage frame 39, as viewed in the front-rear direction. The rotary gear 116 has an annular shape. The rotary gear 116 is arranged such that its center is located on the winding rotational axis A3.

The rotary base member 117 is provided between the rotary gear 116 and the carriage frame 39 with respect to the front-rear direction. The rotary base member 117 is rotatably supported by the carriage frame 39. The rotary base member 117 is made of an annular plate. The rotary base member 117 is arranged coaxially with the rotary gear 116.

The rotary base member 117 is connected to the rotary gear 116 to not be rotated relatively. The rotary base member 117 is connected to the rotary plate 161 to not be rotated relatively.

A driving force of the rotary drive motor 111 is transmitted to the rotary gear 116 and the rotary base member 117 via the first transmission pulley 112, the transmission belt 113, the second transmission pulley 114, and the transmission gear 115. The rotary plate 161 and the tightening part 160 mounted to the rotary plate 161 rotate around the winding rotational axis A3, respectively.

When the tightening part 160 rotates, the tightening fiber bobbin supporting part 162 and the tightening fiber guiding part 170 rotate around the winding rotational axis A3. Therefore, the tightening fiber bundle F1 guided by the tightening fiber guiding part 170 is wound onto the fiber bundles F from the outside.

With the above configuration, the plurality of the fiber bundles F, drawn from a plurality of bobbins of the creel stand 4, can be guided to be arranged side by side at equal intervals in a circumferential direction by two guide part of the fixed fiber bundle guiding part 150 (the large diameter aligning guide part 152 and the small diameter aligning guide part 153). An end of each of the fiber bundles F is fixed to the core material 10 by appropriate means in advance. As the supplying unit 6 moves along the axial direction of the core material 10, by guiding of fixed fiber bundle guiding part 150, the fiber bundles F can be arranged toward the surface of the core material 10 to extend substantially parallel to the axial direction of the core material 10. That is, the 0° winding of the fiber bundles with respect to the core material 10 can be performed.

The tightening part 160 of the supplying unit 6 pulls out the tightening fiber bundle F1 from the tightening fiber bobbin 169 attached to the tightening fiber bobbin support part 162, and guides to a position near the outer peripheral surface of the core material 10 by the winding guide 164. In conjunction with the movement of the supplying unit 6 along the axial direction of the core material 10, the tightening fiber bobbin supporting part 162 and the winding guide 164 rotate. By this rotation, the tightening fiber bundle F1 can be wound around the surface of the core material 10 from outside of the fiber bundles F such that the tightening fiber bundle F1 intersects the direction in which the fiber bundles F extends (the axial direction of the core material 10). This allows the fiber bundles F to be fixed in a state where the fiber bundles F are attached on the surface of the core material 10.

The drive motors (specifically, the front-rear traveling drive motor 91, the left-right traveling drive motor 92, the turn drive motor 93, the lifting drive motor 94, the pitching drive motor 95, and the rotary drive motor 111) included in the supplying device 3 are controlled by the control device 5 in FIG. 1. For such control, for example, as shown in FIG. 1, a position of the supplying unit 6 can be described to define an XYZ rectangular coordinate system with an X-axis that is a left-right axis, a Y-axis that is an up-down axis, and a Z-axis that is a front-rear axis.

Figure 8:
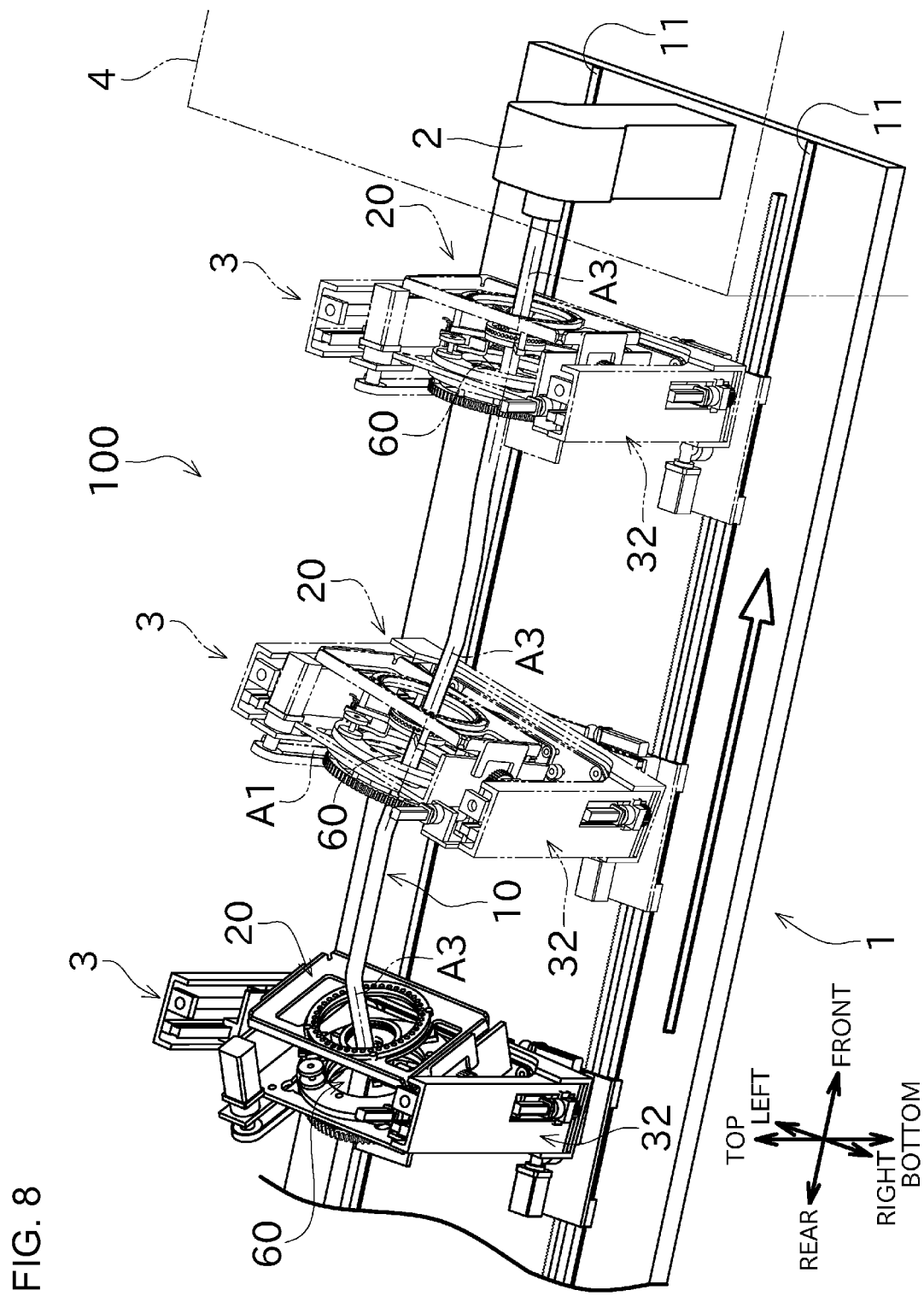
FIG. 8 is a perspective view showing a situation in which a posture of the supplying device changes in accordance with a shape of a core material in a process of the 0° winding of fiber bundles on the core material.

Accordingly, as shown in FIG. 8, the supplying device 3 travels along the rails 11 while adjusting the position and the posture of the supplying unit 6 such that the center of the opening portion 60 of the supplying unit 6 always coincides with the center of the core material 10. That is, the winding rotational axis A3 of the supplying unit 6 always coincides with the axial direction of the core material 10. Accordingly, even in the core material 10 having a curved shape, the 0° winding of the fiber bundles F onto the outer peripheral surface of the core material 10 according to its shape can be performed.

In this example, the fiber bundles F can be arranged on the core material 10 which has originally curved, according to such curved shape. Therefore, it is superior in that the fiber bundles F on the surface of the core material 10 are not disordered, as compared with a configuration in which fiber bundles are arranged on a straight core material and then bent together with the core material.

As described above, the filament winding apparatus 100 of this example includes the rails 11 extending in a first direction, the core material support devices 2 that support the core material 10, and the supplying device 3 that supplies the fiber bundles F to the surface of the core material 10. The supplying device 3 includes the moving part 20, the small diameter aligning guide part 153, the tightening fiber bobbin supporting part 162, and the winding guide 164. The moving part 20 is movable relative to the core material 10 in the front-rear direction. The moving part 20 is movable in left-right direction that is orthogonal to the front-rear direction. The moving part 20 is provided to be rotatable around the rotational axis A1 extending in vertical direction orthogonal to each of the front-rear direction and the left-right direction. The small diameter aligning guide part 153 is placed at the carriage frame 39 which is included in moving part 20. The small diameter aligning guide part 153 has the opening 153a through which the core material 10 can pass. The small diameter aligning guide part 153 guides the plurality of the fiber bundles F to an outer peripheral surface of the core material 10 such that the plurality of the fiber bundles F are arranged side by side in a circumferential direction of the core material 10. The tightening fiber bobbin supporting part 162 is placed at the carriage frame 39 included in the moving part 20 and rotates around a center of the opening 153a. The winding guide 164 rotates around a center of the opening 153a integrally with the tightening fiber bobbin supporting part 162. The winding guide 164 guides the tightening fiber bundle F1 drawn from the bobbin supported by the tightening fiber bobbin supporting part 162 toward the surface of the core material 10.

Accordingly, the 0° winding, in which the fiber orientation angle is 0° relative to the axial direction of the core material 10, can be easily performed. A position and a direction of the small diameter aligning guide part 153 and the like can be changed with respect to the core material 10. Therefore, the fiber bundles can be arranged on the outer peripheral surface of the core material 10 which is curved, and the fiber bundles F arranged around the core material 10 can be wound by the tightening fiber bundle F1 and tightened with respect to the core material 10.

The filament winding apparatus 100 of this example includes the front-rear traveling drive motor 91, the left-right traveling drive motor 92, the turn drive motor 93, the rotary drive motor 111, and the control device 5. The front-rear traveling drive motor 91 moves the moving part 20 in the front-rear direction. The left-right traveling drive motor 92 moves the moving part 20 in the left-right direction. The turn drive motor 93 rotates the moving part 20 around the rotational axis A1. The rotary drive motor 111 rotates the winding guide 164 around the center of the opening 153a. The control device 5 controls the front-rear traveling drive motor 91, the left-right traveling drive motor 92, the turn drive motor 93, the rotary drive motor 111.

Accordingly, the 0° winding of the fiber bundles F on the outer peripheral surface of the core material 10 can be performed automatically, while adjusting the posture of the small diameter aligning guide part 153 and the like in accordance with a shape of the core material 10 which is curved.

In the filament winding apparatus 100 of this example, the moving part 20 includes the main frame 32 and the carriage frame 39. The main frame 32 is movable in the front-rear direction relative to the core material 10. The main frame 32 is movable in the left-right direction that is orthogonal to the front-rear direction. The main frame 32 is provided to be rotatable around the rotational axis A1 extending in the vertical direction orthogonal to each of the front-rear direction and the left-right direction. The carriage frame 39 is movable in the vertical direction relative to the core material 10. The carriage frame 39 is provided to be rotatable around the pitching axis A2 extending in the left-right direction. The small diameter aligning guide part 153, the tightening fiber bobbin supporting part 162 and the winding guide 164 are placed at the carriage frame 39.

Accordingly, the position of the small diameter aligning guide part 153 and the like can be changed in a three-dimensional manner with respect to the core material 10. Therefore, even if the core material 10 is curved in a three-dimensional manner, the 0° winding of the fiber bundles can be performed on the outer peripheral surface of the core material 10.

The filament winding apparatus 100 of this example further includes the pitching drive motor 95 and the lifting motor 94. The pitching drive motor 95 rotates the carriage frame 39 around the pitching axis A2. The lifting motor 94 moves the carriage frame 39 in the vertical direction.

Accordingly, the carriage frame 39 can be rotated around the pitching axis A2 easily by using the pitching drive motor 95. The carriage frame 39 can be moved relatively in the vertical direction easily by using the lifting motor 94.

In the filament winding apparatus 100 of this example, the supplying device 3 includes the large diameter aligning guide part 152 which is provided on the upstream side of the small diameter aligning guide part 153 in the direction of traveling of the fiber bundles F. The large diameter aligning guide part 152 is placed at the carriage frame 39 which is included in the moving part 20. The large diameter aligning guide part 152 has the opening 152a through which the core material 10 can pass. An opening area of the opening 152a in the large diameter aligning guide part 152 is larger than an opening area of the opening 153a in the small diameter aligning guide part 153.

Accordingly, the fiber bundles F are guided by the large diameter aligning guide part 152, and then guided by the small diameter aligning guide part 153 which is located nearer to the core material 10 than the large diameter aligning guide part 152. This two-step guiding allows the fiber bundles F to be smoothly supplied to the surface of the core material 10.

In the filament winding apparatus 100 of this example, the carriage frame 39 included in the moving part 20 has the opening 39a through which the core material 10 pass. An opening area of the opening 153a in the small diameter aligning guide part 153 is smaller than an opening area of the opening 39a in the carriage frame 39.

Accordingly, the fiber bundles F can be guided to a position near the surface of the core material 10 by the small diameter aligning guide part 153. Therefore, the good winding result can be performed.

Figure 9:
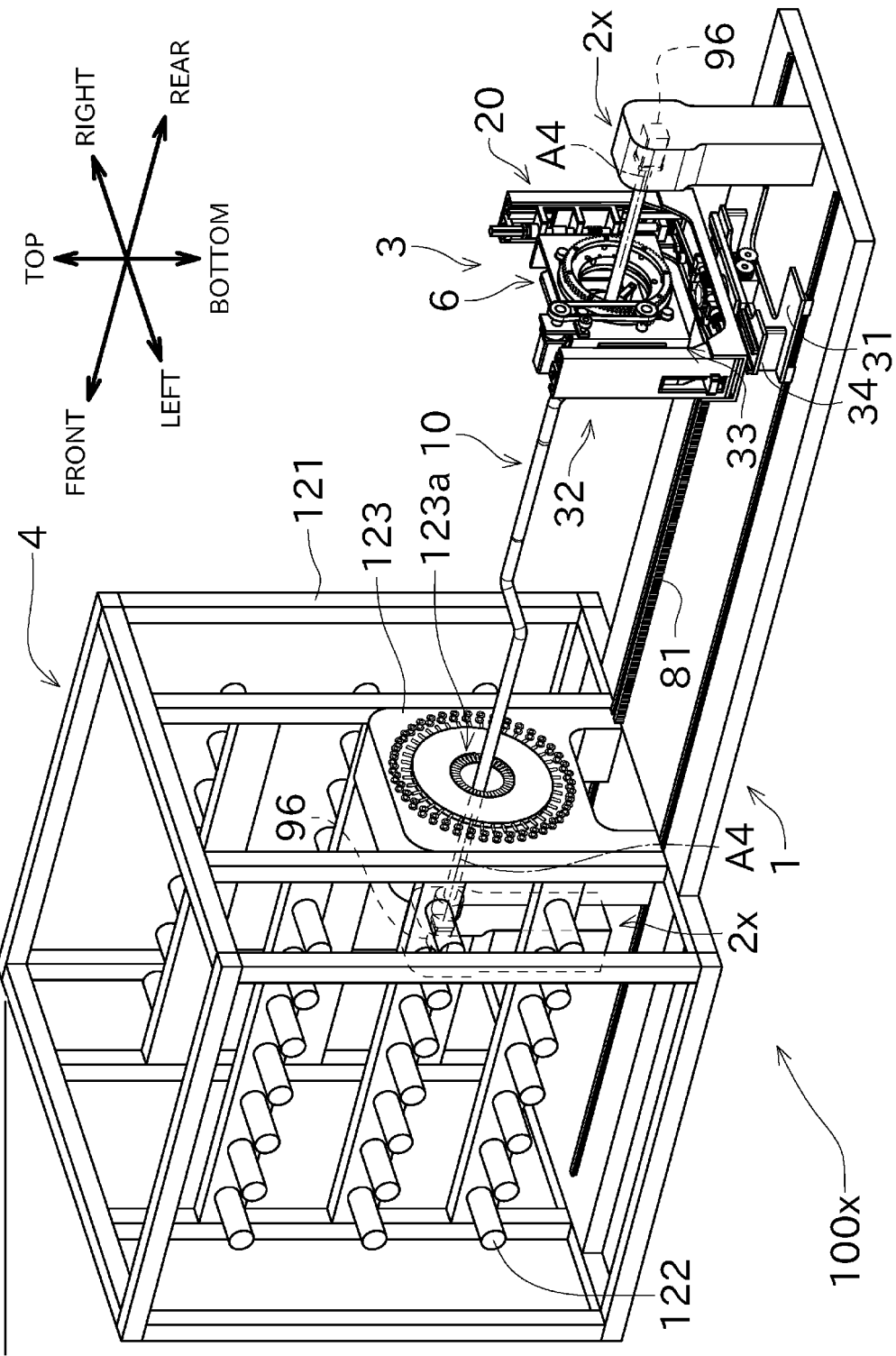
FIG. 9 is a perspective view showing a configuration of a filament winding apparatus according to a second example.

Next, a second example will be described. FIG. 9 is a perspective view showing a filament winding apparatus 100x according to the second example. In a description of this example, members identical or similar to those of the above-described example are given the same corresponding reference numerals on the drawings, and descriptions thereof may be omitted.

In the filament winding apparatus 100x of this example, core material support devices 2x support the core material 10 such that it is rotatable around an axis of both end portions which are supported. Core material support devices 2x can rotate the core material 10 around a supporting axis A4 which is an axis extending in the front-rear direction and passing supported portions of the core material 10.

A core material rotary drive motor (seventh drive source) 96 is provided in core material support devices 2x. The core material rotary drive motor 96 rotates the core material 10 around the supporting axis (third rotational axis) A4 extending in the front-rear direction. The core material rotary drive motor 96 is controlled by the control device 5.

In this configuration, rotation of the core material 10 can change a position and a direction of the core material 10 with respect to the supplying device 3. Therefore, by appropriately rotating the core material 10 according to the shape of the core material 10, even if the core material 10 is curved in a complicated three-dimensional manner, for example, the fiber bundles F can be arranged on the outer peripheral surface of the core material 10 in accordance with the shape.

As described above, in the filament winding apparatus 100x of this example, core material support devices 2x support the core material 10 rotatably around the supporting axis A4 extending in the front-rear direction.

Accordingly, even if the core material 10 is curved in a complicated three-dimensional manner, for example, by rotating the core material 10 in accordance with the shape of the core material 10 (curvature), the posture of the core material 10 can be changed such that the supplying device 3 arrange the fiber bundles F on the core material 10 easily. Therefore, the scope of application of the filament winding apparatus 100x can be expanded and the fiber bundles F can be arranged on the core material 10 of various shapes.

The filament winding apparatus 100x of this example includes the core material rotary drive motor 96. The core material rotary drive motor 96 rotates the core material 10 with respect to the core material support devices 2.

Accordingly, the core material 10 can be rotated easily by using the core material rotary drive motor 96.

Although a preferred example has been described above, the above-described configuration can be modified, for example, as follows.

One of the large diameter aligning guide part 152 and the small diameter aligning guide part 153 may be omitted.

The tightening part 160 may be configured to wind other winding material for tightening, a heat-shrinkable tape, for example, instead of the tightening fiber bundle F1.

The winding method when the tightening part 160 uses the tightening fiber bundle F1 for tightening is not limited, and the tightening may be performed in various winding ways.

In the filament winding apparatus 100, at least one of the two core material support devices 2 may be configured to move a position at which the core material 10 is supported in the vertical direction. At least one of the two core material support devices 2 may be configured to move a position at which the core material 10 is supported in the left-right direction. In this configuration, the core material 10 in which both ends in the front-rear direction are not positioned coaxially, can be supported.

Core material support devices 2x may be configured to rotate the supported core material 10 around an axis different from the supporting axis A4.

The configuration of core material support devices 2x for driving the core material 10 in rotation may be applied to the filament winding apparatus 100 of a first example.

The lifting frame 33 may be omitted, and then the carriage frame 39 may be mounted not to be rotated relative to the main frame 32. In this example, the supplying unit 6 cannot be moved up and down and cannot pitch. However, if the core material 10 is two-dimensionally curved, the fiber bundles F can be wound around the core material 10 without any problem.

The main frame 32 may be configured to not be movable in the left-right direction and not to be rotatable around the rotation axis A1. In this example, the fiber bundles F are arranged on the core material 10 by only vertical movement and pitching of the supplying unit 6. In this modification, the vertical direction may be regarded as the second direction and the pitching axis may be regarded as the first rotational axis. Even with this configuration, the 0° winding of the fiber bundles F can be performed if the core material 10 is two-dimensionally curved.

The front-rear traveling drive motors 91 may be mounted to the moving part 20 and the core material support devices 2, respectively.

A front-rear traveling mechanism including the front-rear traveling drive motors 91 and the like may be provided for each the pair of core material support devices 2. In other words, the core material 10 may be supported to be movable in front-rear direction with respect to the supplying device 3 (the moving part 20). In this example, in the moving part 20, the front-rear traveling drive motors 91 may be omitted and the base frame 31 may be fixed to the travel base 1. Even if the moving part 20 does not move in the front-rear direction, the moving part 20 moves relatively in the front-rear direction with respect to the core material 10, thereby realizing the substantially same operation as in the first and the second examples.

The front-rear traveling drive motors 91 may be mounted to the supplying device 3 and the core material support devices 2 respectively.

A lifting mechanism including the lifting motors 94 and the like may be provided for each the pair of core material support devices 2. In other words, the core material 10 may be supported to be movable in vertical direction with respect to the supplying device 3 (the moving part 20). The support positions at which the core material 10 are supported may move up and down as the entire core material support devices 2 moves up and down, or only the support positions of the core material 10 may move up and down in the core material support device 2. In this example, in the moving part 20, the lifting motor 94 may be omitted and the lifting frame 33 may be fixed to the main frame 32 to not be movable. Even if the moving part 20 does not move in the vertical direction, the moving part 20 moves relatively in the vertical direction with respect to the core material 10, thereby realizing the substantially same operation as in the first and the second examples.

The lifting motor 94 may be mounted to the supplying device 3 and the core material support devices 2 respectively.

The invention claimed is:

1. A filament winding apparatus comprising a rail extending in a first direction, a core material support device that supports a core material, and a supplying device that supplies a fiber bundle to a surface of the core material, the supplying device comprising:
a moving part provided to be movable relative to the core material in the first direction, movable in a second direction orthogonal to the first direction, and rotatable around a first rotational axis extending in a third direction orthogonal to each of the first direction and the second direction;
a fiber bundle guide placed at the moving part, the fiber bundle guide having an opening portion through which the core material can pass, and guiding a plurality of the fiber bundles to an outer peripheral surface of the core material such that the plurality of the fiber bundles are arranged side by side in a circumferential direction of the core material;
a tightening material bobbin support part placed at the moving part and rotates around a center of the opening portion; and
a tightening material guide that rotates around the center of the opening portion integrally with the tightening material bobbin support part, the tightening material guide guiding a tightening material drawn from a bobbin supported by the tightening material bobbin support part toward the surface of the core material.

2. The filament winding apparatus according to claim 1, further comprising:
a first drive source that moves at least any of the core material support device and the moving part in the first direction;
a second drive source that moves the moving part in the second direction;
a third drive source that rotates the moving part around the first rotational axis;
a fourth drive source that rotates the tightening material guide around the center of the opening portion; and
a control device that controls the first drive source, the second drive source, the third drive source, and the fourth drive source.

3. The filament winding apparatus according to claim 1, wherein
the moving part comprises:
a first member provided to be movable relative to the core material in the first direction, movable in the second direction orthogonal to the first direction, and rotatable around the first rotational axis extending in the third direction orthogonal to each of the first direction and the second direction; and
a second member provided to be movable in the third direction relative to the core material and rotatable around a second rotational axis extending in the second direction, and
the fiber bundle guide, the tightening material bobbin support part, and the tightening material guide are placed at the second member.

4. The filament winding apparatus according to claim 3, further comprising:
a fifth drive source that rotates the second member around the second rotational axis; and
a sixth drive source that moves at least one of a position at which the core material support device supports the core material, and the second member in the third direction.

5. The filament winding apparatus according to claim 1, wherein
the core material support device supports the core material rotatably around an axis parallel to the first direction.

6. The filament winding apparatus according to claim 5, further comprising:
a seventh drive source that rotates the core material with respect to the core material support device.

7. The filament winding apparatus according to claim 1, wherein
the supplying device comprises an upstream side fiber bundle guide provided on an upstream side of the fiber bundle guide in a direction of traveling of the fiber bundles, the upstream side fiber bundle guide is placed at the moving part, the upstream side fiber bundle guide has the second opening portion through which the core material can pass, and an opening area of the second opening portion in the upstream side fiber bundle guide is larger than an opening area of the opening portion in the fiber bundle guide.

8. The filament winding apparatus according to claim 1, wherein the moving part has a passage opening portion through which the core material pass, and an opening area of the opening portion in the fiber bundle guide is smaller than an opening area of the passage opening portion.

\* \* \* \* \*